UNITED STATES PATENT OFFICE.

OTTO JACOBI, OF DRESDEN, SAXONY, GERMANY.

METHOD OF MANUFACTURING MATERIAL FOR MAKING TRUNKS, PORTMANTEAUS, &c.

SPECIFICATION forming part of Letters Patent No. 295,015, dated March 11, 1884.

Application filed September 24, 1883. (No specimens.)

*To all whom it may concern:*

Be it known that I, OTTO JACOBI, of the city of Dresden, in the Kingdom of Saxony and German Empire, have invented certain new and useful Improvements in a Method for Manufacturing Material for Making Trunks, Portmanteaus, &c., of which the following is a specification.

My invention relates to the manufacture of a durable material for making traveling-boxes, trunks, portmanteaus, and other objects. It is required of materials for making trunks and such like that they be as light and elastic as possible, and also extremely durable. The materials heretofore employed—such as cardboard, leather, wood, caoutchouc, &c.—possess these qualities only in part, so that substitutes have been recently employed which answer the requirements better, and especially that of lightness—as, for instance, veneering with linen covering, split cane, and such like. The high cost of these materials and the technical difficulties experienced in the manufacture of the same induced me to employ parchment as intermediate layer between two layers of sail-cloth.

My improved process is carried out in the following manner. Strong sail-cloth is immersed in a solution of glue and india-rubber or caoutchouc until the same is entirely saturated; or, instead of this mixture, and especially with stronger sorts, water-glass or silicate is employed, which has the advantage that the same is indifferent to the action of weather after it has become hard. The parchment is applied to the prepared sail-cloth, and is then covered with a second layer of sail-cloth, and this alternate operation continued until the thickness of two to five millimeters is attained. In order to thoroughly combine the materials employed, the finished product is pressed by several heated rollers. The product thus attained is similar to leather, and is extremely light, elastic, and durable.

Having described my said invention and the manner in which the same is to or may be carried into effect, I claim as my invention—

The process of manufacturing a durable material for the manufacture of trunks, portmanteaus, and other objects from specially-prepared sail-cloth, in combination with one or more layers of parchment, substantially as and for the purpose set forth in the foregoing specification.

OTTO JACOBI.

Witnesses:
OTTO WOLFF,
R. HÖHNE,
*Both of Dresden.*